US012546636B2

(12) United States Patent
Van Berkel

(10) Patent No.: US 12,546,636 B2
(45) Date of Patent: Feb. 10, 2026

(54) ACOUSTIC CONTROL AND CHARACTERIZATION OF SAMPLING INTERFACE

(71) Applicant: DH Technologies Development Pte. Ltd., Singapore (SG)

(72) Inventor: Gary J. Van Berkel, Oak Ridge, TN (US)

(73) Assignee: DH Technologies Development Pte. Ltd., Singapore (SG)

( * ) Notice: Subject to any disclaimer, the term of this patent is extended or adjusted under 35 U.S.C. 154(b) by 313 days.

(21) Appl. No.: 18/262,047

(22) PCT Filed: Jan. 25, 2022

(86) PCT No.: PCT/IB2022/050642
§ 371 (c)(1),
(2) Date: Jul. 19, 2023

(87) PCT Pub. No.: WO2022/157746
PCT Pub. Date: Jul. 28, 2022

(65) Prior Publication Data
US 2024/0094037 A1    Mar. 21, 2024

Related U.S. Application Data

(60) Provisional application No. 63/141,168, filed on Jan. 25, 2021.

(51) Int. Cl.
*G01F 1/66* (2022.01)
*G01F 1/663* (2022.01)
(Continued)

(52) U.S. Cl.
CPC ............... *G01F 1/66* (2013.01); *G01F 1/663* (2013.01); *G01F 1/667* (2013.01); *G01F 15/005* (2013.01); *G01N 1/14* (2013.01); *G01N 2001/028* (2013.01)

(58) Field of Classification Search
CPC . G01F 1/666; G01F 1/66; G01F 1/667; G01F 1/663; G01F 15/005; G01N 1/14
See application file for complete search history.

(56) References Cited

U.S. PATENT DOCUMENTS

2020/0357622 A1    11/2020    Arnold

FOREIGN PATENT DOCUMENTS

WO    WO-2019102352 A1 *  5/2019    ............ H01J 49/165

OTHER PUBLICATIONS

PCT, "International Preliminary Report on Patentability," for Application No. PCT/IB2022/050642, 10 pages, mailed Aug. 3, 2023.
(Continued)

*Primary Examiner* — Paul M. West
(74) *Attorney, Agent, or Firm* — Lathrop GPM LLP; Malaika O.D. Tyson; Jason A. Kuchar

(57) ABSTRACT

Disclosed are methods and systems that can detect, monitor, adjust, and optimize fluid dynamic conditions within a sampling system comprising a transport capillary (e.g., an open port interface). The methods and systems detect an acoustic signal within the sampling system and, based on characteristics of the detected acoustic signal, adjust flow rate conditions of the liquid and/or airflow in the sampling system. Also provided are automated control and feedback systems (e.g., automated feedback adjustments made to an inlet pump flow rate, nebulizer gas flow rate, or both) that adjust, tune, and maintain flow conditions within a transport line based on a detected acoustic signal.

19 Claims, 9 Drawing Sheets

(51) Int. Cl.
*G01F 1/667* (2022.01)
*G01F 15/00* (2006.01)
*G01N 1/02* (2006.01)
*G01N 1/14* (2006.01)

(56) References Cited

OTHER PUBLICATIONS

International Search Report and Written Opinion corresponding to International Patent Application No. PCT/IB2022/050642, mailed Apr. 21, 2022.

* cited by examiner

1. Supercritical Vortex

2. Critical Vortex

3. Subcritical Vortex

4. Balanced

5. Pendant Drop

ACOUSTIC CONTROL AND CHARACTERIZATION OF SAMPLING INTERFACE

CROSS-REFERENCE TO RELATED APPLICATIONS

The present application is filed pursuant to 35 U.S.C. 371 as a U.S. National Phase application of International Patent Application No. PCT/IB2022/050642, which was filed Jan. 25, 2022, claiming the benefit of priority from U.S. Provisional patent application Ser. No. 63/141,168 filed Jan. 25, 2021, and each of which is incorporated herein by reference in its entirety.

BACKGROUND

The dynamics of fluids (liquid and/or gas) within sampling systems can effect instrument performance and the resulting data for a variety of analytical techniques commonly used to characterize sample components. For example, sampling systems that utilize a fluidic carrier stream to handle a sample (e.g., uptake, dilute, dissolve, transport, and/or deliver a sample) prior to analysis can have an effect and impact on sample characteristics and assay performance. As such, methods for determining, adjusting, optimizing and maintaining the suitable sampling conditions that relate to flow dynamics within the sampling system structure (e.g., rate, dilution, etc.) can be critical to analytical performance (sensitivity, reproducibility, throughput, etc.). Sampling systems that include an open port interface (OPI) as such systems can introduce one or more interface transition(s) (e.g., liquid/liquid, liquid/gas, liquid/gas/liquid, etc.), liquid streams, and flow rates during sample handling. Accordingly, there is a need for methods and systems that can accurately and conveniently adjust, tune, and optimize the fluid dynamic conditions within sampling systems, such as OPIs, in order to provide for added flexibility and increased consistency in the resulting data.

SUMMARY OF THE DISCLOSURE

In an aspect, the disclosure provides a method for controlling a fluid flowrate through a transfer capillary in a sampling system. In embodiments of this aspect the method may comprise, aspirating a liquid from an open inlet to flow through the transfer capillary to an outlet of the transfer capillary; monitoring an acoustic signal generated by the fluid flow through the transport capillary; measuring at least one characteristic of the acoustic signal; and adjusting the fluid flow rate based on the at least one characteristic of the acoustic signal. In some aspects, the aspirating further comprises aspirating a gas into the liquid at the inlet.

In some aspects, the adjusting the fluid flow rate comprises adjusting a flow of nebulizing gas past the outlet. In some aspects, the adjusting the flow of nebulizing gas comprises adjusting a gas supply of the nebulizing gas. In some aspects, the adjusting the flow of nebulizing gas comprises adjusting a protrusion length of the outlet into the flow of nebulizing gas.

In another aspect, the disclosure provides a method for tuning a flow rate of a capture liquid through a transfer capillary of an open port interface (OPI). In this aspect, the method may comprise aspirating the capture liquid from an open inlet end to an outlet of the transfer capillary monitoring an acoustic signal generated by the capture fluid; comparing at least one characteristic of the acoustic signal with an expected acoustic profile; and tuning an aspiration rate of the capture fluid by adjusting a flow of nebulizing gas past the outlet based on the comparison. In some aspects, the aspiration rate is sufficient to aspirate a gas into the capture fluid at the inlet.

In some embodiments, the expected acoustic profile corresponds to a liquid profile at the open inlet end that optimizes performance of OPI when capturing sample at the inlet. In some aspects, the liquid profile comprises a vortex. In some aspects, the liquid profile comprises a vortex that draws a gas into the capture fluid across the liquid-gas interface at the inlet.

In embodiments of any of the above aspects, the flow of the capture fluid through the transport capillary may be controlled by any type of mechanism(s) that are effective to cause or drive fluidic movement. In embodiments fluidic movement can be controlled by one or more pumps (e.g., a reciprocating pump, a positive displacement pump such as a rotary, gear, plunger, piston, peristaltic, diaphragm pump, or other pump such as a gravity, impulse, pneumatic, electrokinetic, vacuum, and centrifugal pump). In some further embodiments, the pump may comprise a low-pressure pump. In some embodiments, the pump may comprise a Venturi pump or a peristaltic pump. In some embodiments, the pump comprises a nebulizing gas of an ionization source flowing over the outlet.

In embodiments of any of the above aspects, the at least one characteristic of the acoustic signal is frequency or amplitude.

In embodiments of any of the above aspects, the adjusting may comprise modifying the capture liquid supply rate to the inlet. In some embodiments of any of the above aspects, the aspiration rate may be adjusted by adjusting an aspiration suction force applied to the outlet. In some aspects, the aspiration suction force is adjusted by increasing or decreasing a supply of a nebulizing gas flowing past the outlet. In some aspects, the aspiration suction force is adjusted by increasing or decreasing a protrusion of the outlet into a flow of a nebulizing gas flowing past the outlet.

In some aspects and embodiments, the disclosure provides a method for controlling operation of an open port interface (OPI) and can comprise, supplying a capture liquid to an inlet of a transfer capillary of the OPI; aspirating the capture liquid from the inlet; monitoring an acoustic signal generated by the OPI; comparing the acoustic signal to an expected acoustic signal; and, adjusting at least one of an aspiration rate of the capture liquid through the inlet and/or a supply rate of capture liquid to the inlet, based on the comparison.

In some other aspects and embodiments, the disclosure provides a method for optimizing performance of an OPI, wherein the OPI comprises a transfer capillary, the method comprising: supplying a capture liquid to an inlet of the transfer capillary of the OPI; aspirating the capture liquid from the inlet, through the transfer capillary, to an outlet of the transfer capillary; monitoring an acoustic signal generated by the OPI; comparing the acoustic signal to an expected acoustic signal; and, adjusting an aspiration rate of the capture liquid through the inlet based on the comparison to optimize OPI performance.

In some embodiments, the aspirating can be provided by a pump in fluid communication with the OPI. In some embodiments, the aspirating can be provided by a flow of gas around an outlet of the transfer capillary, and wherein the adjusting the aspiration rate comprises adjusting at least one of: a flow rate of the gas, a protrusion of the outlet into the gas flow; and/or a supply flow rate of the capture fluid to the inlet.

In some embodiments, the method can include a pump that can induce a pressure drop at an outlet of the transfer capillary. In yet further embodiments, the method can comprise a pump such as, for example, a reciprocating pump, a positive displacement pump, a gravity pump, an impulse pump, a pneumatic pump, an electrokinetic pump, a vacuum pump, and a centrifugal pump.

In some embodiments of the method, adjusting the aspiration rate can comprise adjusting at least one of: a flow of rate of the gas, a protrusion of the outlet into the gas flow; and, a supply flow rate of the capture fluid to the inlet.

In embodiments, the method further comprises repeating the method until the acoustic signal matches the expected acoustic signal. In some further embodiments the expected acoustic signal corresponds to a vortex liquid profile at the inlet. In some embodiments the expected acoustic signal corresponds to the aspirating a gas. In yet further embodiments, aspirating can comprise aspirating a gas into the capture liquid at the inlet.

In some further embodiments, supplying the capture liquid and/or flow of gas comprises a pump. In further embodiments supplying the capture liquid and/or flow of gas comprises a low-pressure pump. In yet further embodiments flow of gas comprises a pump at the outlet.

In some further embodiments, the transfer capillary, at its outlet, is configured to transfer the sample to a secondary device. In some embodiments the secondary device comprises an ionization source, a mass spectrometer, a UV-Vis detector, a fluorescence detector, an infrared detector, a raman detector, a refractive index detector, an ion mobility spectrometer, an ion differential mobility spectrometer (DMS), a liquid chromatography system, a gas chromatography system, a light scattering detectors, or an evaporative light scattering detector (ELSD). In some further embodiments, the secondary device is an ionization source.

In some embodiments, the method further comprises a Venturi pump.

In some embodiments, monitoring the acoustic signal comprises at least one of frequency or amplitude of the acoustic signal.

In some embodiments, adjusting the aspiration rate of capture liquid comprises adjusting an inlet valve disposed at the inlet of the transfer capillary.

In some embodiments, adjusting the aspiration rate of capture liquid comprises adjusting an outlet valve disposed at the outlet of the transfer capillary.

In some embodiments, the monitoring is at the OPI, at the inlet of the transfer capillary, at an outlet of the transfer capillary, or at a location that is within a range that allows for acoustic signal detection, or a combination of two or more locations.

In some embodiments, the acoustic signal comprises acoustic signal from the gas side of a liquid boundary at a liquid-gas interface.

In embodiments of any of the above methods, the method may improve the analytical performance of a sample handling system. In some further embodiments, the method improves performance of an OPI which may result in improved data obtained downstream of the OPI. In embodiments of any of the above methods, the method may improve the analytical performance of a detector receiving transferred sample captured in the capture fluid at the inlet. In some embodiments, a detector may comprise a mass spectrometer coupled with an ionization source operative to ionize diluted sample at the outlet and deliver ionized sample to the mass spectrometer for analysis.

In other aspects, the disclosure provides a system for acoustic monitoring of a capture liquid flow rate in an analytical device. In some aspects, the capture liquid comprises a solvent. In embodiments of this aspect, the system may comprise a transfer capillary comprising a first end and a second end, wherein the transfer capillary transports the solvent from the first end to the second end such that the solvent is transferred to the analytical device; a pump that is in fluid communication with the transfer capillary to aspirate the solvent from the first end, through the transfer capillary, to exit from the second end; an acoustic transducer disposed near the first end, near the second end, or near both ends of the transfer capillary that is configured to measure an acoustic signal generated by the aspirated solvent at the first end, at the second end, or at both ends of the transfer capillary; and a control system comprising a processor and a software program comprising a series of instructions that are executable by the processor to control the acoustic detector and receive an output from the acoustic transducer, wherein the output comprises at least one of frequency or amplitude of the detected acoustic signal. In some aspects, a gas is aspirated into the solvent at the first end. In some aspects, the acoustic signal is indicative of an amount of aspirated gas sufficient to optimize sample capture in the solvent at the open end.

In other aspects, the disclosure provides a mass spectrometer comprising an acoustic monitoring system comprising a transfer capillary comprising a first end and a second end, wherein the transfer capillary transports a solvent from the first end to the second end such that the solvent is transferred to the mass spectrometer; a pump that is in fluid communication with the transfer capillary to create airflow through the transfer capillary; an acoustic detector disposed near the first end, near the second end, or near both ends of the transfer capillary, wherein the acoustic detector measures acoustic signal generated by the airflow at the first end, at the second end, or at both ends of the transfer capillary; and a control system comprising a processor and a software program comprising a series of instructions that are executable by the processor to control the acoustic detector and receive an output from the acoustic detector, wherein the output comprises at least one of frequency or amplitude of the detected acoustic signal.

In another aspect the disclosure relates to a system for acoustic monitoring flow rate of a fluid in an analytical device, the system comprising: a transfer capillary comprising an inlet and an outlet, wherein the transfer capillary transports fluid from the inlet to the outlet such that the fluid is transferred to the analytical device; a pump that is in fluid communication with the transfer capillary to create fluidic flow through the transfer capillary; an acoustic transducer disposed near the inlet, near the outlet, or near both the inlet and outlet of the transfer capillary, wherein the acoustic transducer measures acoustic signal generated by the flow at the inlet, at the outlet, or at both the inlet and outlet of the transfer capillary; and a control system comprising a processor and a software program comprising a series of instructions that are executable by the processor wherein the series of instructions receives output from the acoustic transducer, wherein the output comprises at least one of frequency or amplitude of the detected acoustic signal.

In some embodiments, the system may further comprise a secondary device at the outlet of the transfer capillary.

In some embodiments, the pump can comprise a reciprocating pump, a positive displacement pump, a gravity pump, an impulse pump, a pneumatic pump, an electrokinetic pump, a nebulizer, a vacuum pump, and a centrifugal pump.

In some embodiments, the secondary device can comprise: an ionization source, a mass spectrometer, a UV-Vis detector, a fluorescence detector, a refractive index detector, an infrared detector, a raman detector, an ion mobility spectrometer, an ion differential mobility spectrometer (DMS), a liquid chromatography system, a gas chromatography system, a light scattering detectors, or an evaporative light scattering detector (ELSD), or combinations thereof.

In some embodiments, the pump can comprise a Venturi pump or a nebulizer, or both a Venturi pump and a nebulizer.

In some embodiments, the transfer capillary can comprise an adjustable valve disposed at the inlet of the transfer capillary, an adjustable valve disposed at the outlet of the transfer capillary, or adjustable valves at both the inlet and outlet of the transfer capillary.

In yet a further aspect, the disclosure provides a mass spectrometer comprising the acoustic monitoring system according to any one of the embodiments as disclosed herein.

Other aspects and embodiments of the disclosure will be apparent in light of the description and illustrative figures that follow.

BRIEF DESCRIPTION OF THE DRAWINGS

FIG. 3A illustrates the frequency at low liquid flow rate; FIG. 3B illustrates the frequency at a medium liquid flow rate; and FIG. 3C illustrates the frequency at high liquid flow rate.

DETAILED DESCRIPTION

The disclosure provides systems and methods derived from a recognition that the fluid dynamics in a sampling system can be accurately and conveniently characterized, tuned, and adjusted based on an acoustic signal generated by the flow of sample through the system. In various aspects and embodiments, the disclosure relates to systems and methods that can (among other features) control and optimize sample handling and delivery from the sampling system to a secondary analytical device such as, for example, a mass spectrometer, ultimately providing for analytical data that has increased accuracy and consistency.

In a general sense, the disclosure provides systems, and methods and modes for operating a sampling interface such as, for example, an open port interface (OPI) for an analytical instrument such as a mass spectrometer. In some embodiments the disclosure provides a method for operating a sampling system that comprises generating a flow rate of gas and/or liquid into the that is sufficient to generate a supercritical vortex at a sampling interface. In some aspects the method comprises flowing a gas and/or liquid into a sampling interface, (e.g., the gas and/or liquid is drawn into the sampling interface (e.g., OPI)) and through a capillary transfer line. The gas flow that is drawn/entrained into the interface may create an audible sound at one or both ends of the interface (e.g., at the open port sampling tip/sampling interface, transition/delivery to a secondary analytic device). Characteristics of the sound level (e.g., decibels), frequency, and/or other acoustic features of the signal may be detected and analyzed. These features may be combined with optional feedback controls that can be used to tune and adjust the operative gas and/or liquid flow rates to a particular state that provides for improved or optimized sampling at the interface (e.g., OPI), and delivery of sample to an analytic device.

In some aspects and embodiments the systems and methods comprise an OPI. In such embodiments, identifying and maintaining an appropriate ratio of solvent flow into the OPI at the sampling end, and out of the OPI to a secondary device (e.g., an ion source of a mass spectrometer) can maintain consistent flow dynamics throughout the OPI and consistent amounts of sampled material to a secondary analytic device (e.g., ionization source). The characteristics of the sample (e.g., solid, liquid, gas, viscosity, flowability, etc.) and the sampling method (e.g., direct extraction, laser ablation plume capture, microliter volume droplets, nanoliter volume droplets, etc.) can have a direct effect on determining suitable or optimized flow dynamics and mass transport characteristics within a sampling system such as an OPI. Thus, the disclosure provides convenient methods and systems for changing, tuning, and optimizing the dynamic flow characteristics, and can provide systems for automating such methods.

Figure 1A:
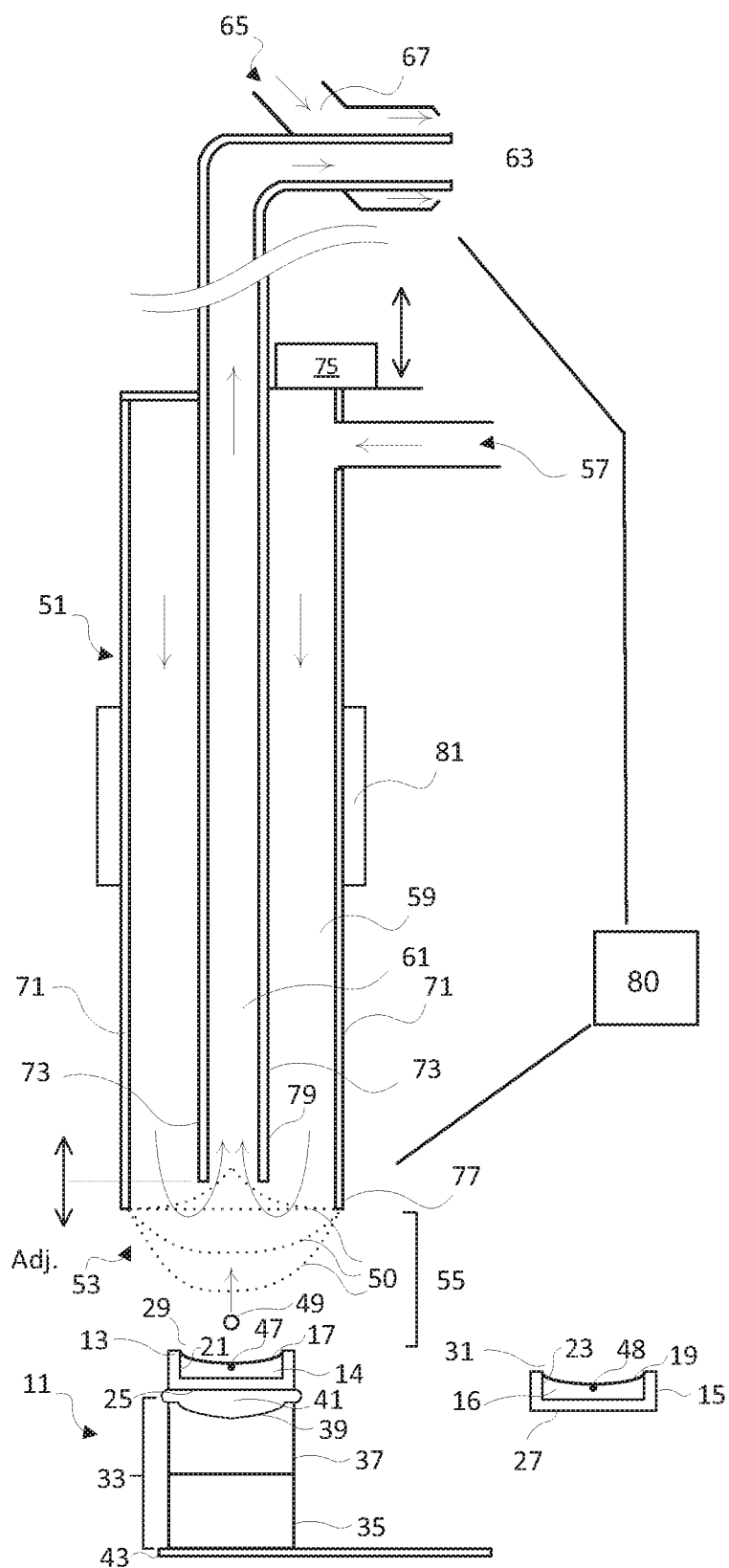
FIGS. 1A-1B illustrate an open port interface (OPI) sampling interface and an acoustic droplet ejection (ADE) device in accordance with some example aspects and embodiments of the disclosure.

A representative system in accordance with example aspects and embodiments of the disclosure is illustrated in FIG. 1A. As with all figures referenced herein, in which like parts are referenced by like numerals, FIG. 1A is not to scale, and certain dimensions are exaggerated for clarity of presentation. In FIG. 1A, the acoustic droplet ejection (ADE) device is shown generally at 11, ejecting droplet 49 toward the continuous flow sampling probe (referred to herein as an open port interface (OPI)) indicated generally at 51 and into the sampling tip 53 thereof.

The acoustic droplet ejection device 11 includes at least one reservoir, with a first reservoir shown at 13 and an optional second reservoir 31. In some embodiments a further plurality of reservoirs may be provided. Each reservoir is configured to house a fluid sample having a fluid surface, e.g., a first fluid sample 14 and a second fluid sample 16 having fluid surfaces respectively indicated at 17 and 19. When more than one reservoir is used, as illustrated in FIG. 1A, the reservoirs are preferably both substantially identical and substantially acoustically indistinguishable, although identical construction is not a requirement.

The ADE comprises acoustic ejector 33, which includes acoustic radiation generator 35 and focusing means 37 for focusing the acoustic radiation generated at a focal point 47 within the fluid sample, near the fluid surface. As shown in FIG. 1A, the focusing means 37 may comprise a single solid piece having a concave surface 39 for focusing the acoustic radiation, but the focusing means may be constructed in other ways as discussed below. The acoustic ejector 33 is thus adapted to generate and focus acoustic radiation so as to eject a droplet of fluid from each of the fluid surfaces 17 and 19 when acoustically coupled to reservoirs 13 and 15, and thus to fluids 14 and 16, respectively. The acoustic radiation generator 35 and the focusing means 37 may function as a single unit controlled by a single controller, or they may be independently controlled, depending on the desired performance of the device.

The acoustic droplet ejector 33 may be in either direct contact or indirect contact with the external surface of each reservoir. With direct contact, in order to acoustically couple the ejector to a reservoir, it is preferred that the direct contact be wholly conformal to ensure efficient acoustic energy transfer. That is, the ejector and the reservoir should have corresponding surfaces adapted for mating contact. Thus, if acoustic coupling is achieved between the ejector and reservoir through the focusing means, it is desirable for the reservoir to have an outside surface that corresponds to the surface profile of the focusing means. Without conformal contact, efficiency and accuracy of acoustic energy transfer may be compromised. In addition, since many focusing means have a curved surface, the direct contact approach may necessitate the use of reservoirs that have a specially formed inverse surface.

Optimally, acoustic coupling is achieved between the ejector and each of the reservoirs through indirect contact, as illustrated in FIG. 1A. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and the underside of the reservoir. In addition, it is important to ensure that the fluid medium is substantially free of material having different acoustic properties than the fluid medium itself. As shown, the first reservoir 13 is acoustically coupled to the acoustic focusing means 37 such that an acoustic wave generated by the acoustic radiation generator is directed by the focusing means 37 into the acoustic coupling medium 41, which then transmits the acoustic radiation into the reservoir 13.

In operation, reservoir 13 and optional reservoir 15 of the device are filled with first and second fluid samples 14 and 16, respectively, as shown in FIG. 1A. The acoustic ejector 33 is positioned just below reservoir 13, with acoustic coupling between the ejector and the reservoir provided by means of acoustic coupling medium 41. Initially, the acoustic ejector is positioned directly below sampling tip 53 of OPI 51, such that the sampling tip faces the surface 17 of the fluid sample 14 in the reservoir 13. Once the ejector 33 and reservoir 13 are in proper alignment below sampling tip 53, the acoustic radiation generator 35 is activated to produce acoustic radiation that is directed by the focusing means 37 to a focal point 47 near the fluid surface 17 of the first reservoir. As a result, droplet 49 is ejected from the fluid surface 17 toward and into the liquid boundary 50 at the sampling tip 53 of the OPI 51, where it combines with solvent in the flow probe 53. The profile of the liquid boundary 50 at the sampling tip 53 may vary from extending beyond the sampling tip 53 to projecting inward into the OPI 51, as described in more detail below in relation to other FIGs. In a multiple-reservoir system, the reservoir unit (not shown), e.g., a multi-well plate or tube rack, can then be repositioned relative to the acoustic ejector such that another reservoir is brought into alignment with the ejector and a droplet of the next fluid sample can be ejected. The solvent in the flow probe cycles through the probe continuously, minimizing or even eliminating "carryover" between droplet ejection events. Fluid samples 14 and 16 are samples of any fluid for which transfer to an analytical instrument is desired, where the term "fluid" is as defined earlier herein.

The structure of OPI 51 is also shown in FIG. 1A. Any number of commercially available continuous flow sampling probes can be used as is or in modified form, all of which, as is well known in the art, operate according to substantially the same principles. As can be seen in the FIG. 1A, the sampling tip 53 of OPI 51 is spaced apart from the fluid surface 17 in the reservoir 13, with a gap 55 therebetween. The gap 55 may be an air gap, or a gap of an inert gas, or it may comprise some other gaseous material; there is no liquid bridge connecting the sampling tip 53 to the fluid 14 in the reservoir 13. The OPI 51 includes a solvent inlet 57 for receiving solvent from a solvent source and a solvent transport capillary 59 for transporting the solvent flow from the solvent inlet 57 to the sampling tip 53, where the ejected droplet 49 of analyte-containing fluid sample 14 combines with the solvent to form an analyte-solvent dilution. A solvent pump (not shown) is operably connected to and in fluid communication with solvent inlet 57 in order to control the rate of solvent flow into the solvent transport capillary and thus the rate of solvent flow within the solvent transport capillary 59 as well.

Fluid flow within the OPI 51 carries the analyte-solvent dilution through a sample transport capillary 61 provided by inner capillary tube 73 toward sample outlet 63 for subsequent transfer to an analytical instrument. A sampling pump (not shown) can be provided that is operably connected to and in fluid communication with the sample transport capillary 61, to control the output rate from outlet 63. In a preferred embodiment, a positive displacement pump is used as the solvent pump, e.g., a peristaltic pump, and, instead of a sampling pump, an aspirating nebulization system is used so that the analyte-solvent dilution is drawn out of the sample outlet 63 by the Venturi effect caused by the flow of the nebulizing gas introduced from a nebulizing gas source 65 via gas inlet 67 (shown in simplified form in FIG. 1A, insofar as the features of aspirating nebulizers are well known in the art) as it flows over the outside of the sample outlet 63. The analyte-solvent dilution flow is then drawn upward through the sample transport capillary 61 by the pressure drop generated as the nebulizing gas passes over the sample outlet 63 and combines with the fluid exiting the sample transport capillary 61. A gas pressure regulator is used to control the rate of gas flow into the system via gas inlet 67. In a preferred manner, the nebulizing gas flows over the outside of the sample transport capillary 61 at or near the sample outlet 63 in a sheath flow type manner which draws the analyte-solvent dilution through the sample transport capillary 61 as it flows across the sample outlet 63 that causes aspiration at the sample outlet upon mixing with the nebulizer gas.

The solvent transport capillary 59 and sample transport capillary 61 are provided by outer capillary tube 71 and inner capillary tube 73 substantially co-axially disposed therein, where the inner capillary tube 73 defines the sample transport capillary, and the annular space between the inner capillary tube 73 and outer capillary tube 71 defines the solvent transport capillary 59.

The system can also include an adjuster 75 coupled to the outer capillary tube 71 and the inner capillary tube 73. The adjuster 75 can be adapted for moving the outer capillary tube tip 77 and the inner capillary tube tip 79 longitudinally relative to one another. The adjuster 75 can be any device capable of moving the outer capillary tube 71 relative to the inner capillary tube 73. Exemplary adjusters 75 can be motors including, but are not limited to, electric motors (e.g., AC motors, DC motors, electrostatic motors, servo motors, etc.), hydraulic motors, pneumatic motors, translational stages, and combinations thereof. As used herein, "longitudinally" refers to an axis that runs the length of the probe 51, and the inner and outer capillary tubes 73, 71 can be arranged coaxially around a longitudinal axis of the probe 51, as shown in FIG. 1A-B.

Additionally, as illustrated in FIG. 1A, the OPI 51 may be generally affixed within an approximately cylindrical holder 81, for stability and ease of handling.

Figure 1B:
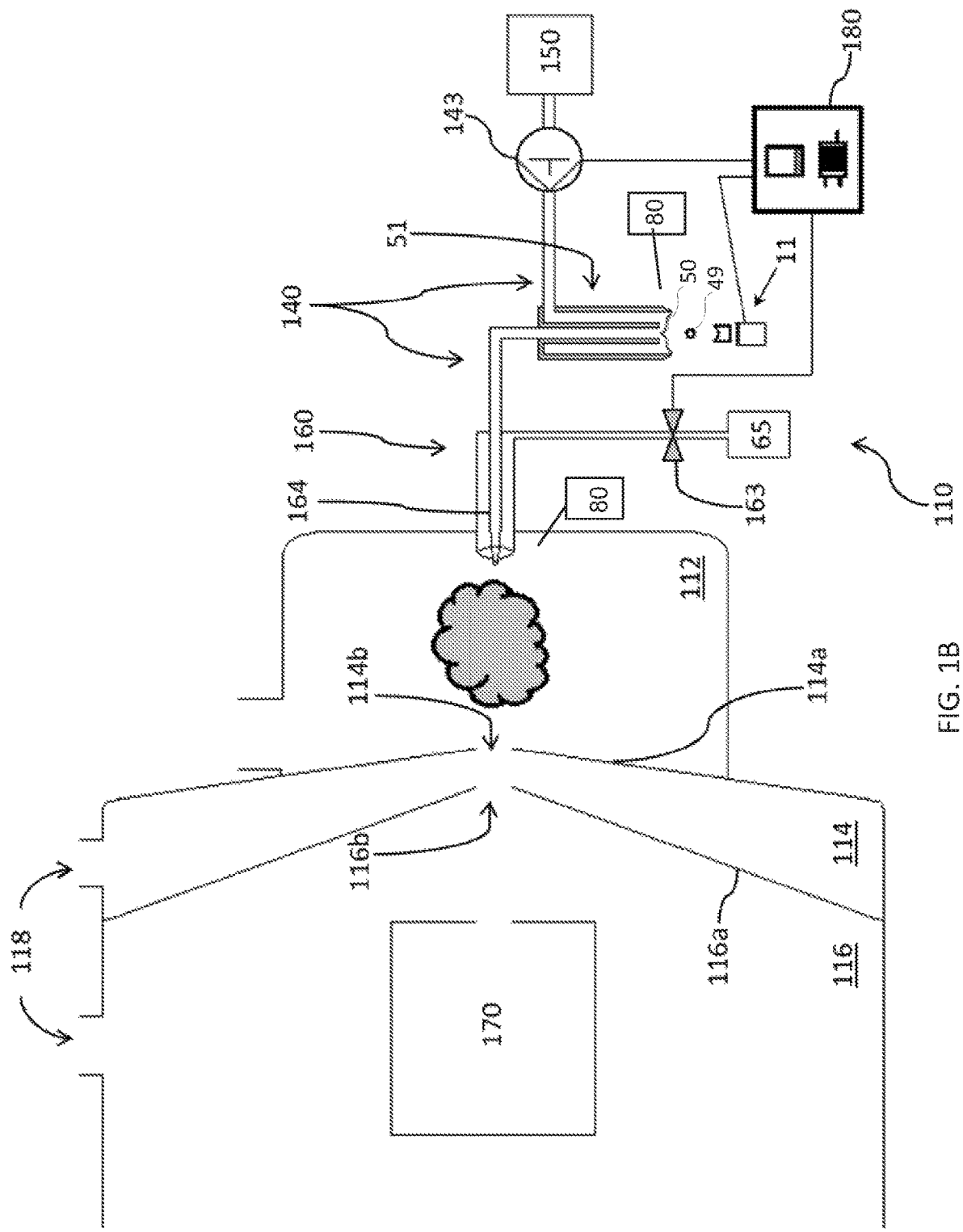

FIG. 1B schematically depicts an embodiment of an exemplary system 110 in accordance with various aspects of the applicant's teachings for ionizing and mass analyzing analytes received within an open end of a sampling probe 51, the system 110 including an acoustic droplet injection device 11 configured to inject a droplet 49, from a reservoir into the open end of the sampling probe 51. As shown in FIG. 1B, the exemplary system 110 generally includes a sampling probe 51 (e.g., an open port probe) in fluid communication with a nebulizer-assisted ion source 160 for discharging a liquid containing one or more sample analytes (e.g., via electrospray electrode 164) into an ionization chamber 112, and a mass analyzer 170 in fluid communication with the ionization chamber 112 for downstream processing and/or detection of ions generated by the ion source 160. A fluid handling system 140 (e.g., including one or more pumps 143 and one or more conduits) provides for the flow of liquid from a solvent reservoir 150 to the sampling probe 51 and from the sampling probe 51 to the ion source 160. For example, as shown in FIG. 1B, the solvent reservoir 150 (e.g., containing a liquid, desorption solvent) can be fluidly coupled to the sampling probe 51 via a supply conduit through which the liquid can be delivered at a selected volumetric rate by the pump 143 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, flow of liquid into and out of the sampling probe 51 occurs within a sample space accessible at the open end such that one or more droplets can be introduced into the liquid boundary 50 at the sample tip 53 and subsequently delivered to the ion source 160.

As shown, the system 110 includes an acoustic droplet injection device 11 that is configured to generate acoustic energy that is applied to a liquid contained with a reservoir (as depicted in FIG. 1A) that causes one or more droplets 49 to be ejected from the reservoir into the open end of the sampling probe 51. A controller 180 can be operatively coupled to the acoustic droplet injection device 11 and can be configured to operate any aspect of the acoustic droplet injection device 11 (e.g., focusing means, acoustic radiation generator, automation means for positioning one or more reservoirs into alignment with the acoustic radiation generator, etc.) so as to inject droplets into the sampling probe 51 or otherwise discussed herein substantially continuously or for selected portions of an experimental protocol by way of non-limiting example.

As shown in FIG. 1B, the exemplary ion source 160 can include a source 65 of pressurized gas (e.g. nitrogen, air, or a noble gas) that supplies a high velocity nebulizing gas flow which surrounds the outlet end of the electrospray electrode 164 and interacts with the fluid discharged therefrom to enhance the formation of the sample plume and the ion release within the plume for sampling by 114b and 116b, e.g., via the interaction of the high speed nebulizing flow and jet of liquid sample (e.g., analyte-solvent dilution). The nebulizer gas can be supplied at a variety of flow rates, for example, in a range from about 0.1 L/min to about 20 L/min, which can also be controlled under the influence of controller 180 (e.g., via opening and/or closing valve 163). In accordance with various aspects of the present teachings, it will be appreciated that the flow rate of the nebulizer gas can be adjusted (e.g., under the influence of controller 180) such that the flow rate of liquid within the sampling probe 51 can be adjusted based, for example, on suction/aspiration force generated by the interaction of the nebulizer gas and the analyte-solvent dilution as it is being discharged from the electrospray electrode 164 (e.g., due to the Venturi effect).

In the depicted embodiment, the ionization chamber 112 can be maintained at an atmospheric pressure, though in some embodiments, the ionization chamber 112 can be evacuated to a pressure lower than atmospheric pressure. The ionization chamber 112, within which the analyte can be ionized as the analyte-solvent dilution is discharged from the electrospray electrode 164, is separated from a gas curtain chamber 114 by a plate 114a having a curtain plate aperture 114b. As shown, a vacuum chamber 116, which houses the mass analyzer 170, is separated from the curtain chamber 114 by a plate 116a having a vacuum chamber sampling orifice 116b. The curtain chamber 114 and vacuum chamber 116 can be maintained at a selected pressure(s) (e.g., the same or different sub-atmospheric pressures, a pressure lower than the ionization chamber) by evacuation through one or more vacuum pump ports 118.

It will also be appreciated by a person skilled in the art and in light of the teachings herein that the mass analyzer 170 can have a variety of configurations. Generally, the mass analyzer 170 is configured to process (e.g., filter, sort, dissociate, detect, etc.) sample ions generated by the ion source 160. By way of non-limiting example, the mass analyzer 170 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-$Q_{linear}$ ion trap (Q TRAP®) mass spectrometer," authored by James W. Hager and J. C. Yves Le Blanc and published in Rapid Communications in Mass Spectrometry (2003; 17: 1056-1064), and U.S. Pat. No. 7,923,681, entitled "Collision Cell for Mass Spectrometer," which are hereby incorporated by reference in their entireties. Other configurations, including but not limited to those described herein and others known to those skilled in the art, can also be utilized in conjunction with the systems, devices, and methods disclosed herein. For instance other suitable mass spectrometers include single quadrupole, triple quadrupole, ToF, trap, and hybrid analyzers. It will further be appreciated that any number of additional elements can be included in the system 110 including, for example, an ion mobility spectrometer (e.g., a differential mobility spectrometer) that is disposed between the ionization chamber 112 and the mass analyzer 170 and is configured to separate ions based on their mobility through a drift gas in high- and low-fields rather than their mass-to-charge ratio). Additionally, it will be appreciated that the mass analyzer 170 can comprise a detector that can detect the ions which pass through the analyzer 170 and can, for example, supply a signal indicative of the number of ions per second that are detected.

In accordance with the aspect and embodiments of the disclosure, an acoustic signal can be detected and/or monitored in one or more regions of the sampling system. In example embodiment in accordance with FIGS. 1A-1B the signal may be detected and/or monitored by a detection device or acoustic transducer 80, at or near the sampling interface region generally in the area of the liquid boundary 50, sampling tip 53, and/or gap 55, at a receiving end of a sample transport capillary (e.g., 61, 73, 77, 79) and/or at the opposite end of the fluid handling system (e.g., outlet 63 of transport capillary in FIG. 1A, 140 in FIG. 1B) that transfers sample to a secondary device such as an ionization chamber 112, an ion source 160, and/or an electrospray electrode 164 (e.g., as depicted in the example embodiment of FIG. 1B).

In an aspect, the disclosure provides various methods for controlling the fluid dynamics within a sampling system. The methods, in various aspects, may be used to control, adjust, tune, and/or optimize the ratio of a fluid flow rate (e.g., liquid and/or liquid and air flow rate) through a transfer capillary in a sampling system such as, for example, an open port interface. In embodiments the methods comprise flowing a solvent from a first end to a second end of the transfer capillary, wherein at the first end an optional sample may be introduced into the transfer capillary and the optional sample exits the transfer capillary at the second end; flowing a gas through the transfer capillary from the first end to the second end of the transfer capillary to create an airflow that can modify the solvent flow rate from the first end to the second end of the transfer capillary; monitoring an acoustic signal generated by the airflow at the first end of the transfer capillary or the second end of the transfer capillary, or at both ends; measuring at least one characteristic of the acoustic signal; and adjusting the solvent flow rate and/or the rate of the flowing gas based on the at least one characteristic of the acoustic signal.

Acoustic signal (e.g., sound) may be measured by any method and device that is generally known in the art, including suitable methods that provide for the measurement and analysis of sound level and/or full spectrum sound frequency output. Thus, in aspects and embodiments in accordance with the disclosure, the methods and systems may comprise a device capable of measuring, recording, and/or analyzing an acoustic signal or frequency that may be characteristic of the fluid dynamics within a sampling system. In some non-limiting embodiments, the system may comprise any one or more of sound level meters, microphones, amplifiers, pre-amplifiers, speakers, acoustic calibrators, vibration calibrators, vibrometers and accelerometers, noise dosimeters, log limiters, processors and software that is configured to control and adjust any one or more system components. In some example embodiments, the methods and systems may comprise a device that integrate a microphone, a display, and software configured to record, measure, and display an acoustic signal such as, for example, a smartphone comprising a "spectroid" phone app that may capture of frequency of sound, or a change in sound. In some embodiments, such devices may be used in combination with other recording instruments and devices (e.g., for recording video and/or sound), allowing for detection (e.g., audible) of the difference in acoustic signal generated by the sampling system under different conditions.

In embodiments of any of the above aspects, the at least one characteristic of the acoustic signal is frequency or amplitude.

In embodiments, the flow of the solvent and/or gas may be controlled by a pressure control mechanism (e.g., regulator) and/or a pump, including a low-pressure pump such as a Venturi pump or a peristaltic pump. In some embodiments, a secondary device may comprise the pump and/or pressure control mechanism, or may further comprise a second pump and/or a second pressure control mechanism that can affect flow (e.g., vacuum-driven flow).

In embodiments of any of the above aspects, the adjusting may comprise modifying the solvent flow rate at the first end of the transfer capillary using an inlet valve disposed at the first end. In some embodiments of any of the above aspects, the adjusting may comprise modifying the solvent flow rate at the second end of the transfer capillary using an outlet valve disposed at the second end. In yet other embodiments of any of the above aspects, the adjusting may comprise modifying (i) the solvent flow rate at the first end of the transfer capillary using an inlet valve disposed at the first end, and (ii) the solvent flow rate at the second end of the transfer capillary using an outlet valve disposed at the second end In embodiments, the transfer capillary may be configured to transfer the sample to a secondary device comprising an analytical instrument. In some embodiments, the secondary device(s) may comprise an ionization source, a mass spectrometer, a UV-Vis detector, a fluorescence detector, an infrared detector, a raman detector, a refractive index detector, an ion differential mobility spectrometer (DMS), a liquid chromatography system, a gas chromatography system, a light scattering detector, or an evaporative light scattering detector (ELSD), or combinations thereof. In some embodiments, the secondary device may comprise an ionization source. The ionization source, or "ion source", can be any conventional ion source that is operable to receive liquid containing sample, and ionize the sample to produce sample ions (including e.g., Atmospheric Pressure Chemical Ionization (APCI), Inductively Coupled Plasma (ICP), Electron Impact Ionization (EI), Fast Atom Bombardment (FAB), Electrospray Ionization (ESI), or Matrix Assisted Laser Desorption Ionization (MALDI), etc.). In some embodiments, in addition to the ion source, the secondary device may comprise a mass spectrometer and/or a differential mobility spectrometer (DMS). In some embodiments, the secondary device may comprise a liquid chromatograph (LC) column. In some embodiments, the transfer capillary may be configured to receive a sample that may be in particulate, gaseous, or liquid form. In some further embodiments the sample may be provided to the transfer capillary as a droplet (e.g., via an acoustic ejector), as ablated particulates (e.g., via laser ablation), or in the gas phase (e.g., via gas phase chromatography).

In other aspects, the disclosure provides a system for acoustic monitoring of a solvent flow rate in an analytical device. In embodiments of this aspect, the system may comprise an automated device configuration comprising a sensor that detects the condition of the fluid in the sample capture region of a transfer capillary, and via a feedback system adjusts, controls and/or maintains optimal conditions by regulating one or more of a solvent flow rate (e.g., an inlet pump flow rate) and an airflow rate (e.g., a nebulizer gas flow rate). In embodiments the system further comprises a transfer capillary comprising a first end and a second end, wherein the transfer capillary transports a solvent from the first end to the second end such that the solvent is transferred to the analytical device; a pump that is in fluid communication with the transfer capillary to create airflow through the transfer capillary; an acoustic detector disposed near the first end, near the second end, or near both ends of the transfer capillary that is configured to measure an acoustic signal generated by the airflow at the first end, at the second end, or at both ends of the transfer capillary; and a control system comprising a processor and a software program comprising a series of instructions that are executable by the processor to control the acoustic detector and receive an output from the acoustic detector, wherein the output comprises at least one of frequency or amplitude of the detected acoustic signal. In further embodiments, the control system comprises feedback controls configured to adjust one or more of solvent flow rate and airflow rate at the sample interface and/or at the second end of the transfer capillary.

In other aspects, the disclosure provides a mass spectrometer comprising an acoustic monitoring system comprising a transfer capillary comprising a first end and a second end, wherein the transfer capillary transports a solvent from the first end to the second end such that the solvent is transferred to the mass spectrometer; a pump that is in fluid communication with the transfer capillary to create airflow through the transfer capillary; an acoustic detector disposed near the first end, near the second end, or near both ends of the transfer capillary, wherein the acoustic detector measures acoustic signal generated by the airflow at the first end, at the second end, or at both ends of the transfer capillary; and a control system comprising a processor and a software program comprising a series of instructions that are executable by the processor to control the acoustic detector and receive an output from the acoustic detector, wherein the output comprises at least one of frequency or amplitude of the detected acoustic signal.

In some aspects and embodiments the disclosure relates to methods comprising operating conditions wherein the liquid flow rate of a carrier liquid into a transport capillary may be at the lower end of an operable flow rate range. In such embodiments, the carrier liquid and any sample may flow essentially only along the capillary wall. In embodiments that are operative under these flow conditions in the capillary, the flow of air and the low flow rate of liquid may form a center core that only includes the gas stream (i.e., no liquid carrier or sample). Within this lower liquid flow rate range, the acoustic signal may have a frequency that is lower, and may be audible as a low frequency sound. In embodiments wherein conditions are adjusted to increase liquid flow rate, the acoustic signal frequency may increase and may be audible as a higher frequency sound. An audible sound may be observable until the liquid flow rate increases to a point that any gas stream is no longer entrained in the flow within the capillary tube, and the carrier liquid spans the entire diameter of the capillary (i.e., no vortex is formed).

As a general illustrative description of the dynamic flow characteristics that may occur in certain example embodiments of a transfer capillary (e.g., in an OPI), the solvent flow dynamics and the shape of a liquid meniscus at the sampling end of the capillary/OPI may go through a series of transitions as solvent flow rates into and out of the system change (e.g., low to high). At lower solvent flow rates, and as noted above, the flow of solvent through the capillary tube is confined substantially to the walls of the capillary, and a flow of air is drawn into the capillary/OPI forming an open core. Under these conditions, the airflow into the capillary/OPI and through the system generates an acoustic signal (i.e., an audible sound) at the sampling interface end, the second end (sample delivery end), or at both ends of the transfer capillary. As solvent flow rate increases, solvent takes up additional volume within the capillary (i.e., solvent begins to fill the interior core of the capillary) the gas flow rate and volumes change. This can create an acoustic signal with an audible sound that changes frequency (from lower to higher frequency) as the solvent flow rate increases. In this mode, the acoustic signal can be detected (i.e., as audible sound) to a point at which the solvent flow rate is sufficiently high that no more airflow enters, or is drawn into, the OPI. This provides for embodiments wherein the frequency spectrum (e.g., pitch, sound amplitude) can be analyzed to determine the ratio or balance between flow of solvent and air into the OPI as well as flow stability (e.g., interrupted acoustic signal, which may be detected as a "chirping" or "burping" of an audible signal, may be detected within the capillary/OPI). Depending on the particular characteristics of the sample, the ratio may be adjusted and tuned to a particular acoustic frequency.

In alternative sampling applications, such as laser ablation (see FIG. 4A), liquid capture of a sample may be enhanced by airflow into the probe, which can increase the entrapment of sample particles that are ablated from a substrate. For example, material generated from laser ablation can be taken up in an airflow that brings the material (i.e., ablated particles) into the capture probe. In some embodiments, airflow and solvent flow rates may allow for an amount of carrier gas comprising ablated particulates to be taken in at the open port, and forming a vortex that can be detected and/or monitored by the disclosed methods and systems. Guiding or otherwise modifying airflow to the capture probe, based on an acoustic signal (e.g., audible sound) can optimize sample handling and data collection in a range of systems comprising an open port interface.

Thus, the methods and systems in accordance with the disclosure allow for the determination and optimization of the general state of operation and sample flow within a transfer capillary/OPI based on monitoring and analyzing acoustic signal. The methods and systems thus provide for the incorporation of appropriate feedback controls, optionally automated feedback controls that can adjust and vary the solvent flow to maintain operation of the sampling system in a desired state. Additional aspects and embodiments of the disclosure will be apparent in light of the illustrative examples that follow.

EXAMPLES

In the illustrative examples below, and in accordance with the aspects and embodiments of the disclosure, a series of experiments are performed to provide a proof of concept that fluid dynamics within a transport capillary can be measured, analyzed, adjusted, and optimized based on an acoustic signal.

Figure 2A:
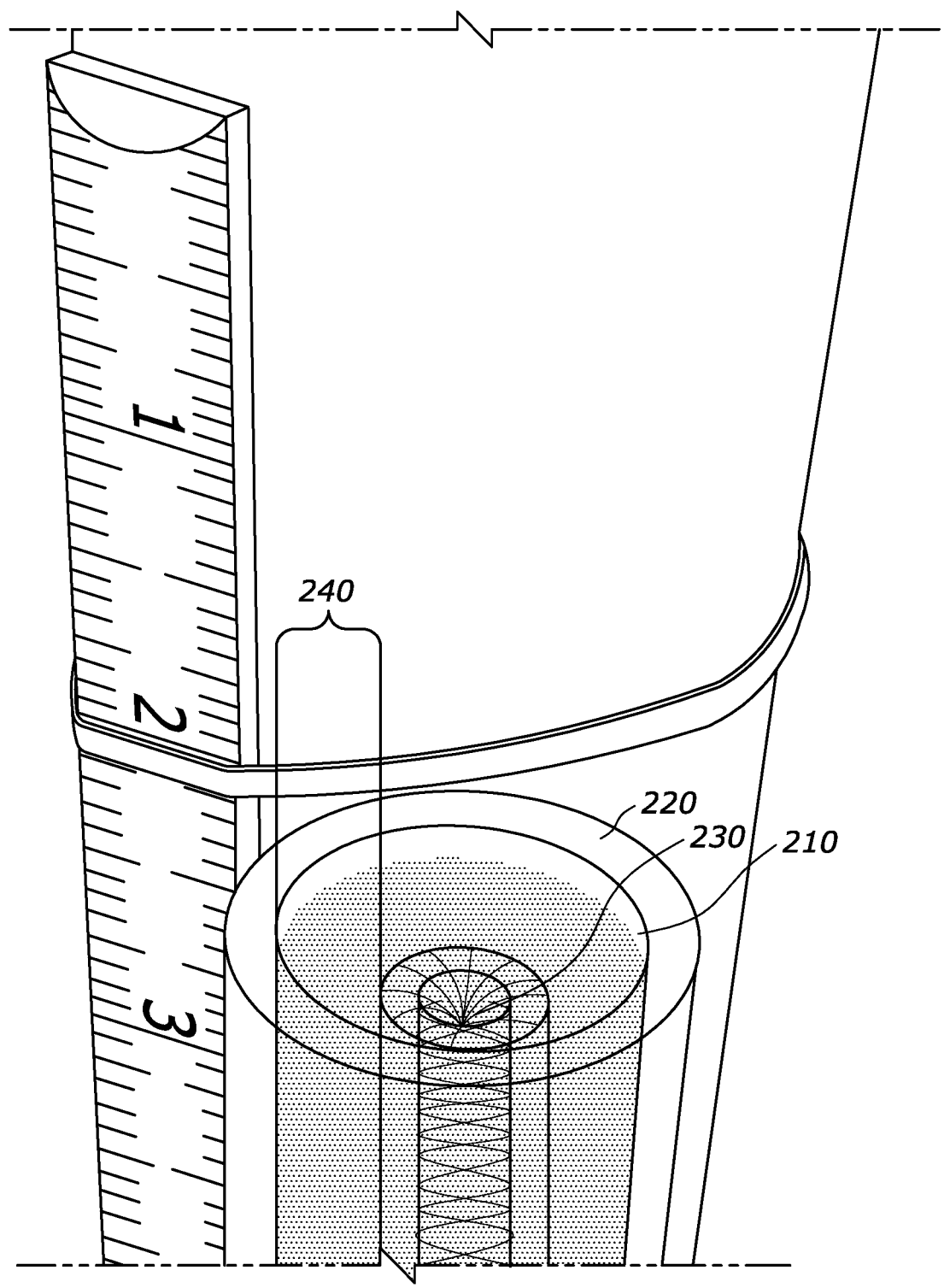
FIGS. 2A-2B illustrate a large-scale model of an open port interface that can be used as a proof of concept for the various methods and systems of the aspects and embodiments of the disclosure.
Figure 2B:
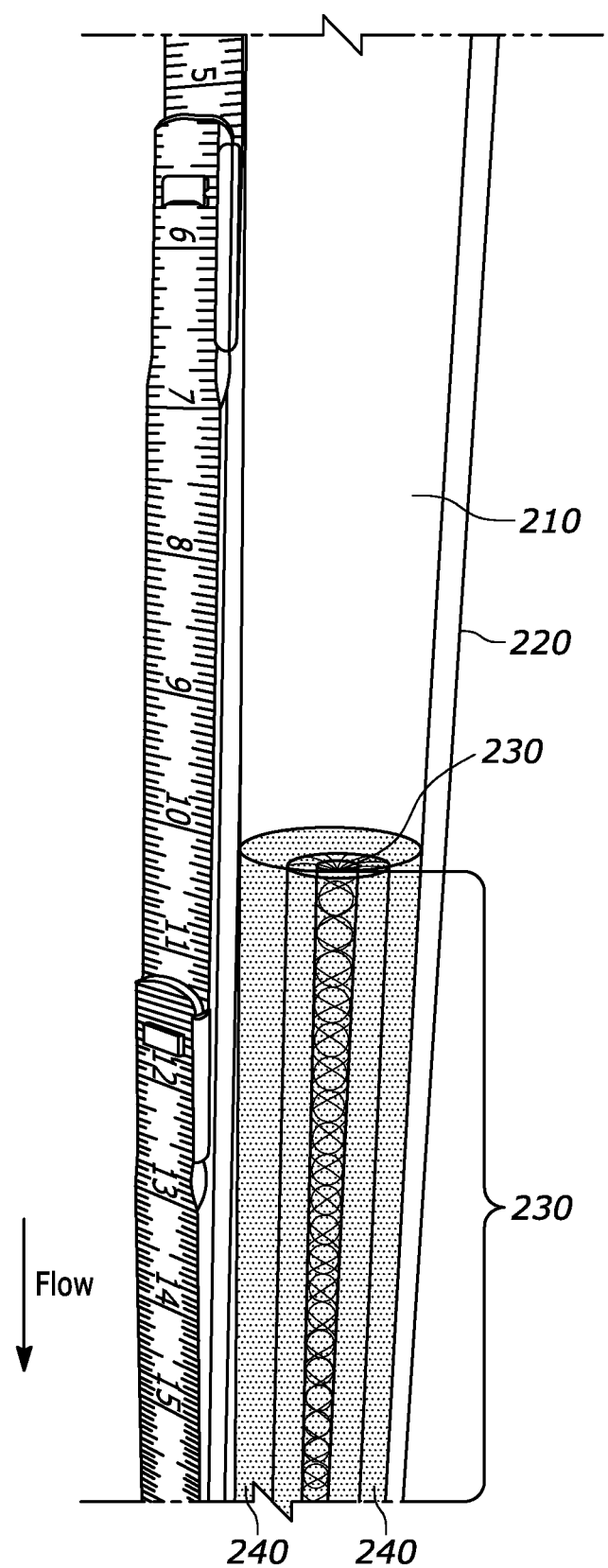

Example 1. Analysis of OPI: Air Core Flow in OPI Operated in Supercritical Vortex Mode Airflow into OPI, such as illustrated in FIGS. 1A-1B can generate an acoustic signal and may be controlled to generate an audible sound. A large-scale model of an OPI is constructed to provide a proof of concept illustrative of the aspects and embodiments provided by the disclosure. A "mega" OPI as depicted in FIGS. 2A-2B is constructed generally as a large-scale model ($20x$ scale) of a type of OPI, and allows for simple and convenient acoustic (sound) analysis of airflow through the system. Briefly, the system comprises two co-axial plexiglass tubes (inner tube 210, outer tube 220) and gravity flow, shown by an arrow indicating flow direction, out the inner sampling tube (210), and forming a vortex/liquid-air interface (230). Water into the annulus region (240) between the two tubes is supplied from a potable water supply (not shown). Flow in and out can be independently adjusted using valves on an inlet and outlet. While this system generally mimics the dynamics of an OPI, it allows for easy visualization of the fluid dynamics (e.g., vortex formation, liquid flow, liquid/air interface) happening with in the system, relative to a commercial version of typical OPI. A similar sound is expected to be generated from the airflow into a "normal" sized OPI, with differences in the acoustic frequencies and magnitude arising from the different dimensions and the different resulting airflow velocities that are generated.

Figure 3A:
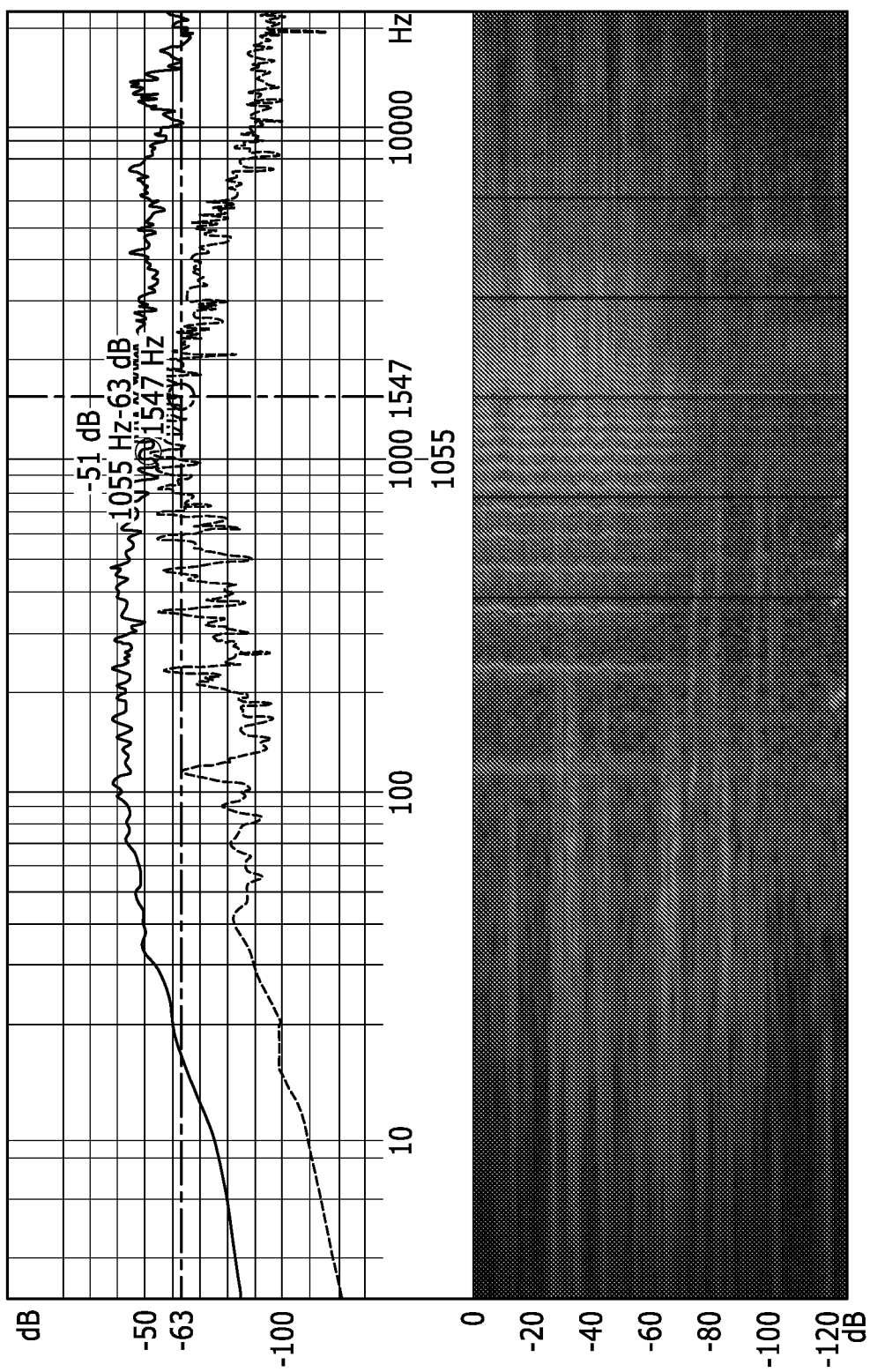
FIGS. 3A-3C illustrate frequency measurements using a spectroid smartphone application obtained using the large scale model depicted in FIGS. 2A-2B.
Figure 3B:
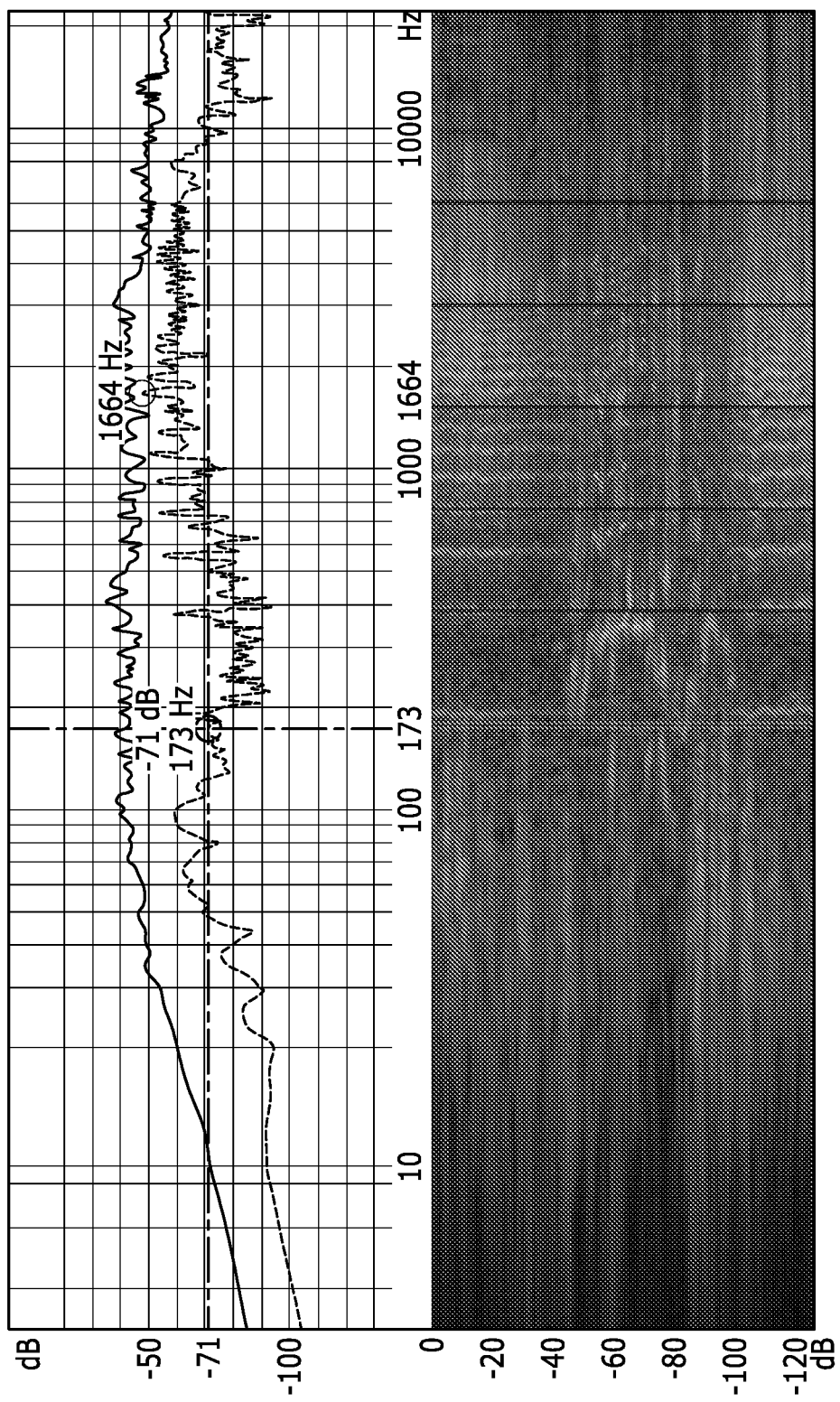
Figure 3C:
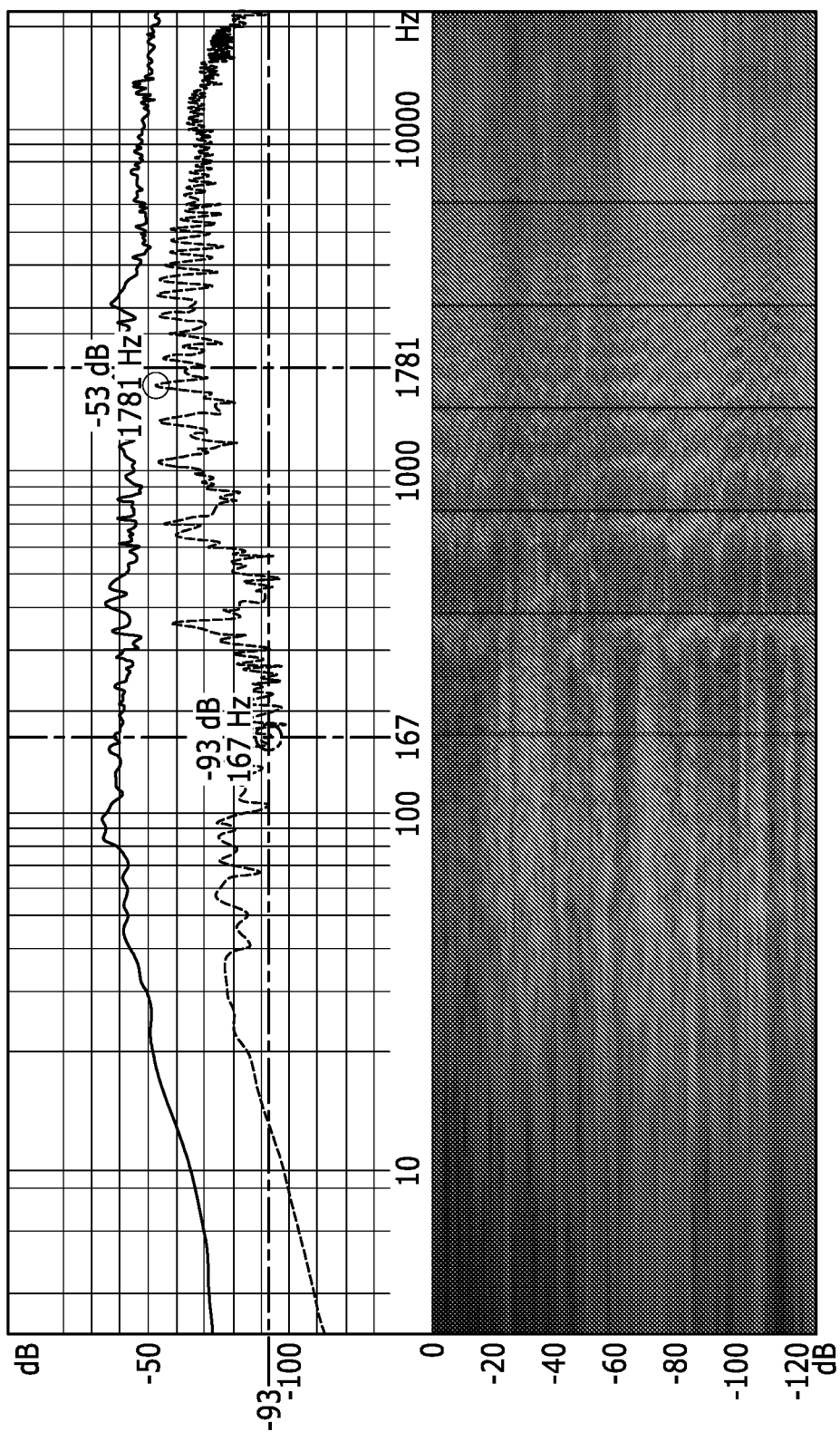

In accordance with the disclosure, the frequency of sound is detected and a change in frequency associates with changing liquid flow rate, and therefore can characterize a changing airflow rate/velocity into and through the system. A smartphone and spectroid software application can capture the acoustic frequency spectrum of the sound generated under varying operating conditions, at low liquid flow rate (FIG. 3A), medium liquid flow rate (FIG. 3B), and high liquid flow rate (FIG. 3C). The liquid and airflow rates can be adjusted and the ratio of the flow rates correlate with a change in detected acoustic frequency.

Figure 4A:
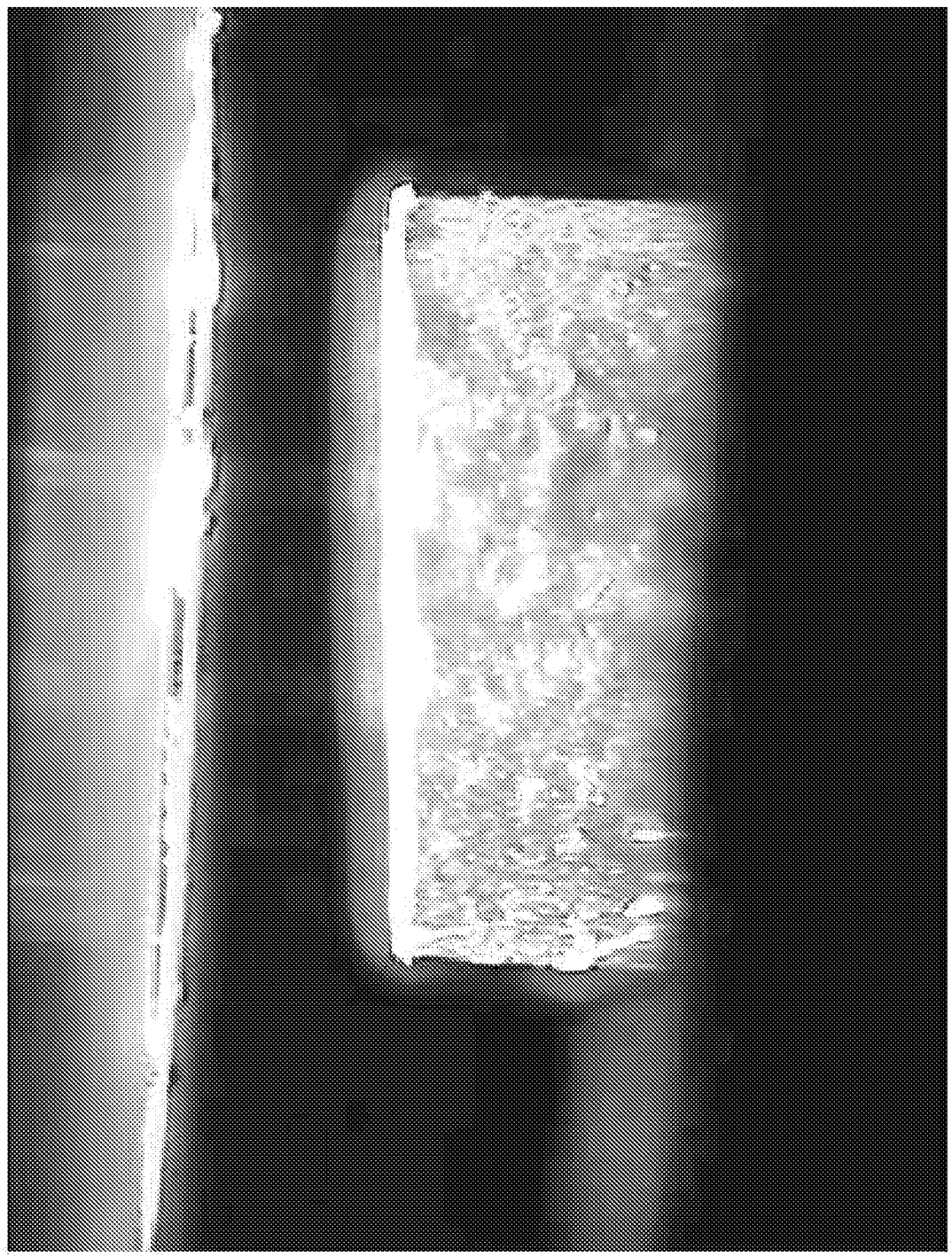
FIG. 4A depicts an arrangement of a laser ablation sampling medium positioned proximate to (above) an open port interface, illustrating that the aspects and embodiments of the disclosure may be adapted for non-liquid based samples and sampling systems.
Figure 5:
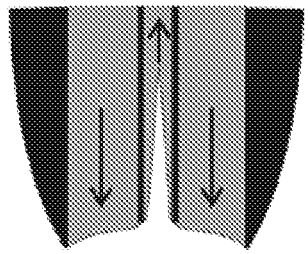
FIG. 5 depicts, as stylized cross-sectional views, various capture fluid interface formations that may form at an inlet of an OPI under various flow rates, including formation of different vortices, a pendant drop, and a balanced interface.
Figure 5:
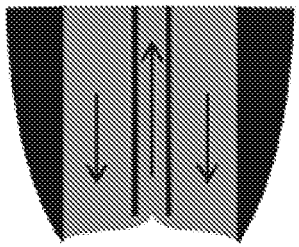
Figure 5:
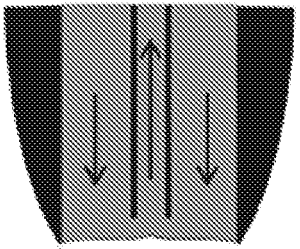
Figure 5:
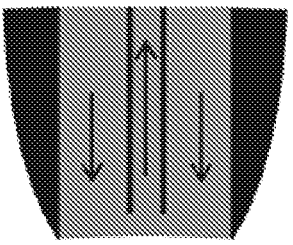
Figure 5:
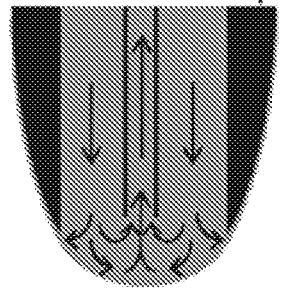

Example 2. OPI Operated in Vortex Mode for Laser Ablation-Liquid Vortex Capture—MS In accordance with the disclosure, the methods and systems disclosed herein can be used in sampling systems comprising a non-liquid sample. In one example, an acoustic monitoring system and method can be adapted for use with laser ablation. As shown in FIG. 4A, a substrate comprising a sample for laser ablation sampling may be positioned proximate to an open port interface, wherein airflow drawn into probe draws the ablated sample particulates into the probe and optionally a liquid vortex for sample transport.

In accordance with the aspect, embodiments, and illustrative examples provided above, the disclosure provides solutions that can detect and adjust fluidic conditions within the capture region of a sampling system comprising a transport capillary (e.g., an open port interface). The disclosure provides methods and systems that maintain optimal fluidic conditions by regulating carrier liquid and/or airflow in the sampling system. The system provides for automated means (e.g., software configured to execute automated feedback adjustment to inlet pump flow rate, nebulizer gas flow rate, or both) to adjust, tune, and maintain flow conditions within a transport line, providing a highly stable flow profile from sample inlet to sample outlet.

The invention claimed is:

1. A method for controlling operation of an open port interface (OPI), the method comprising:
   supplying a capture liquid to an inlet of a transfer capillary of the OPI;
   aspirating the capture liquid from the inlet;
   monitoring an acoustic signal generated by the OPI, wherein the acoustic signal comprises acoustic signal from a gas side of a liquid boundary at a liquid-gas interface;
   comparing the acoustic signal to an expected acoustic signal; and,
   adjusting at least one of an aspiration rate of the capture liquid through the inlet and/or a supply rate of capture liquid to the inlet, based on the comparison.

2. The method of claim 1, wherein the aspirating is provided by a pump in fluid communication with the OPI.

3. The method of claim 1, wherein the aspirating is provided by a flow of gas around an outlet of the transfer capillary, and wherein the adjusting the aspiration rate comprises adjusting at least one of:
   a flow rate of the gas,
   a protrusion of the outlet into the gas flow; and,
   a supply flow rate of the capture liquid to the inlet.

4. The method of claim 1, wherein a pump induces a pressure drop at an outlet of the transfer capillary.

5. The method according to claim 1, wherein the method further comprises repeating the method until the acoustic signal matches the expected acoustic signal.

6. The method according to claim 1, wherein the expected acoustic signal corresponds to a vortex liquid profile at the inlet.

7. The method according to claim 1, wherein the expected acoustic signal corresponds to aspirating a gas into the capture liquid at the inlet.

8. The method according to claim 1, wherein the outlet of the transfer capillary transfers a sample to a secondary device.

9. The method according to claim 8, wherein the secondary device is an ionization source.

10. The method according to claim 8, wherein the secondary device comprises an ionization source, a mass spectrometer, a UV-Vis detector, a fluorescence detector, an infrared detector, a raman detector, a refractive index detector, an ion mobility spectrometer, an ion differential mobility spectrometer (DMS), a liquid chromatography system, a gas chromatography system, a light scattering detectors, or an evaporative light scattering detector (ELSD).

11. The method according to claim 1, wherein supplying the capture liquid and/or a flow of gas comprises a pump.

12. The method according to claim 1, wherein a flow of gas comprises a pump at an outlet.

13. The method according to claim 1, further comprising wherein the aspirating is provided by a Venturi pump.

14. The method according to claim 1, wherein monitoring the acoustic signal comprises at least one of frequency or amplitude of the acoustic signal.

15. The method according to claim 1, wherein adjusting the aspiration rate of capture liquid comprises adjusting an inlet valve disposed at the inlet of the transfer capillary.

16. The method according to claim 1, wherein adjusting the aspiration rate of capture liquid comprises adjusting an outlet valve disposed at the outlet of the transfer capillary.

17. The method according to claim 1, wherein the monitoring is at the OPI, at the inlet of the transfer capillary, at an outlet of the transfer capillary, or at a location that is within a range that allows for acoustic signal detection, or a combination of two or more locations.

18. A method for optimizing performance of an OPI, wherein the OPI comprises a transfer capillary, the method comprising:
   supplying a capture liquid to an inlet of the transfer capillary of the OPI;
   aspirating the capture liquid from the inlet, through the transfer capillary, to an outlet of the transfer capillary;
   monitoring an acoustic signal generated by the OPI, wherein the acoustic signal comprises acoustic signal from a gas side of a liquid boundary at a liquid-gas interface;
   comparing the acoustic signal to an expected acoustic signal; and,
   adjusting an aspiration rate of the capture liquid through the inlet based on the comparison to optimize OPI performance.

19. A system for acoustic monitoring flow rate of a fluid in an analytical device, the system comprising:

a) a transfer capillary comprising an inlet and an outlet, wherein the transfer capillary transports fluid from the inlet to the outlet such that the fluid is transferred to the analytical device;
b) a pump that is in fluid communication with the transfer capillary to create fluidic flow through the transfer capillary;
c) an acoustic transducer disposed near the inlet, near the outlet, or near both the inlet and outlet of the transfer capillary, wherein the acoustic transducer measures acoustic signal generated by the flow at the inlet, at the outlet, or at both the inlet and outlet of the transfer capillary, wherein the acoustic signal comprises acoustic signal from a gas side of a liquid boundary at a liquid-gas interface; and
d) a control system comprising a processor and a software program comprising a series of instructions that are executable by the processor wherein the series of instructions receives output from the acoustic transducer, wherein the output comprises at least one of frequency or amplitude of the detected acoustic signal at the inlet, at the outlet, or at both the inlet and outlet of the transfer capillary.

* * * * *